United States Patent [19]

Warren et al.

[11] 4,394,538

[45] Jul. 19, 1983

[54] SPEECH RECOGNITION SYSTEM AND METHOD

[75] Inventors: Ben Warren, Saratoga; George M. White, Los Altos; Rick Parfitt, Los Gatos; Peter Deng, San Jose, all of Calif.

[73] Assignee: Threshold Technology, Inc., Delran, N.J.

[21] Appl. No.: 240,273

[22] Filed: Mar. 4, 1981

[51] Int. Cl.³ ............................................. G10L 1/00
[52] U.S. Cl. .................................. 179/1 SD; 364/513
[58] Field of Search ............... 179/1 SD, 1 SM, 1 SC; 340/146.3 WD, 146.3 AQ; 364/513

[56] References Cited

U.S. PATENT DOCUMENTS 4,069,393 1/1978 Martin et al. ..................... 179/1 SD
4,100,370 7/1978 Suzuki et al. ..................... 179/1 SD

FOREIGN PATENT DOCUMENTS 1225242 3/1971 United Kingdom .

OTHER PUBLICATIONS

J. Shearme et al., "Some Experiments with a Word Recognition System," IEEE Trans. on Audio and Elec., Jun. 1968, pp. 256-261.
S. Nakagawa et al., "A Realtime Spoken Word Recognition System", Computer Controls, May-Jun., 1978, pp. 63-71.
Clapper, "Connected Word Recognition System", IBM Tech. Bull., Dec. 1969, pp. 1123-1126.

Primary Examiner—Emanuel S. Kemeny
Attorney, Agent, or Firm—Martin Novack

[57] ABSTRACT

An apparatus for receiving spoken input training words and for subsequently recognizing a spoken input command word. For each training word, and for the command word, there is stored a time dependent array and a cumulative feature non-time-dependent vector. The command word array is compared, member-by-member, with each training word array. Also, the command word vector is compared, feature-by-feature, with each training word vector. The results of both comparisons are used for selecting the training word which most closely matches the command word.

24 Claims, 10 Drawing Figures

SPEECH RECOGNITION SYSTEM AND METHOD

BACKGROUND OF THE INVENTION

This invention relates to speech recognition and, more particularly, to an apparatus and method for receiving spoken input "training" (or vocabulary) words, and subsequently recognizing a spoken input command word as being one of the training words.

There have been previously developed various equipments that recognize limited vocabularies of spoken words by analysis of acoustic events. Typically, such equipments are useful in "voice command" applications wherein, upon recognizing particular words, the equipment produces electrical signals which control the operation of a companion system. For example, a voice command could be used to control a conveyor belt to move in a specified manner or may control a computer to perform specified operations.

Preveious efforts to develop automatic methods of speech recognition, while attaining varying levels of success, led to the realization of the exceedingly complex nature of speech communication. Normal speech has a high information content with considerable variability from speaker to speaker and some variability even in the same word when spoken by the same individual. Therefore, a "perfect" recognition scheme is unattainable since the nature of the speech signal to be recognized cannot be precisely defined. As a result, the preferred past schemes have been empirical approaches which have yielded at least a reasonable level of confidence, from a statistical standpoint, that a particular spoken word corresponded to a selected one of a limited machine vocabulary. The desirability of such schemes are thus not determinable by theoretical examination, but rather by a straightforward measure of recognition accuracy over an extended period of operation.

For various reasons, most prior art systems have been found unsuitable for practical applications. One of the prime reasons has been the shear complexity of equipments that attempted to make an overly rigorous analysis of received speech signals. In addition to the expense and appurtenant unreliability, such systems have a tendency to establish highly complicated and restrictive recognition criteria that may reject normal variations of the system vocabulary words. Conversely, some equipments suffer from establishing recognition criteria that are too easily met and result in the improper acceptance of extraneous words not included in the preselected vocabulary of the equipment.

In the U.S. Pat. No. 4,069,393, assigned to the same assignee as the parent application, there is disclosed an apparatus which receives spoken input "training" words and a subsequent spoken input "command" word and generates a correlation figure that is indicative of the resemblance of the command word to each training word. A feature extraction means processes received input words and generates digital feature output signals on particular ones of a number of feature output lines, the particular ones depending on the characteristic features of the word being spoken. The status of the feature signals which occur during each training word are stored as a time normalized matrix or array. Subsequently, the status of the feature signals which occur during a command word are also stored as a time normalized array. The command word array is then compared, member by member, with each training word array and a correlation figure is generated for each comparison. If a sufficiently high correlation is found between the command word array and a particular training word array, the command word is deemed to correspond to the particular training word. Existing versions of this type of system have been found to operate most satisfactorily (although not exclusively) in applications where command words are spoken in "isolation"; i.e., where there are distinct pauses (e.g. of the order of hundreds of milliseconds), between words, the pauses defining the word boundaries. Generally, circuitry is provided which senses the onset of speech after a pause and which then senses the next substantial absence of speech. These occurrences are considered the boundaries of a word, and the feature events which occur between these boundaries are used to form the array referred to above.

The just described type of speech recognition apparatus has found useful commercial application and can operate with relatively high recognition accuracy, especially when sufficient processing capability is provided to obtain a fairly rigorous analysis of spoken words at a relatively high sampling rate, and when sophisticated correlation techniques are employed. Applicants have noted, however, that speech recognition techniques which employ comparisons of time-dependent arrays can sometimes be subject to degradation of recognition accuracy when a particular word is spoken in a different manner at different times, even by the same speaker. As described in the above-referenced U.S. Pat. No. 4,069,393, this problem can be alleviated somewhat by employing time-normalization of feature arrays and by utilizing time-shifted comparisons of arrays as well as non-time-shifted array comparisons. However, there is still substantial room for improvement of recognition accuracy, especially in systems intended to be relatively inexpensive and therefore intended to operate with limited memory and processing capability. Further, improvement is particularly necessary in systems wherein the training words and command words are not necessarily spoken by the same person.

It is an object of the present invention to provide an apparatus and method which results in improved recognition accuracy without undue increases in the cost or complexity of the recognition system.

SUMMARY OF THE INVENTION

The present invention utilizes prior art techniques of comparing time-dependent arrays of features as part of the speech recognition process. Applicants have discovered, however, that speech recognition accuracy can be significantly enhanced by also employing recognition criteria that involve comparison of non-time-dependent feature vectors which are indicative of the cumulative presence of feature signals during a command word and during training words. Each non-time-dependent feature vector may be an n-dimensional vector that is indicative of the cumulative presence of each of n selected speech features regardless of when the features occur during the word utterance.

In accordance with the invention, there is provided an apparatus and method for receiving spoken input training (or vocabulary) words and subsequently recognizing an spoken input command word. In the apparatus, feature extraction means are provided for generating feature signals dependent upon the features present in a spoken input word. Means are provided for storing, as a time-dependent reference array, the presence or absence status of feature signals during each training word. Means are also provided for storing, as a non-time-dependent reference vector, an indication of the cumulative presence of feature signals during each training word. Further means are provided for storing, as a time-dependent feature array, the status of feature signals during a command word. Still further means are provided for storing, as a non-time-dependent feature vector, an indication of the cumulative presence of feature signals during the command word. Comparing means are provided for comparing, member-by-member, the command word feature array with each training word reference array to obtain an array comparison figure for each training word. Further comparison means are provided for comparing, feature-by-feature, the command word feature vector with each training word reference vector to obtain a vector comparison figure for each training word. Finally, means responsive to both the array comparison figure and the vector comparison figure for each training word are provided for selecting the training word which most closely matches the command word.

The present invention has particular application to so-called "isolated word" speech recognition systems in which there is a distinct pause betweeen the speaking of individual command words. However, it will become understood that the principles of the present invention may be applied to so-called "continuous" or "connected speech" recognition systems or to almost continuous speech recognition of the type described in copending U.S. Application Ser. No. 138,643, assigned to the same assignee as the present application.

Further features and advantages of the invention will become more readily apparent from the following detailed description when taken in conjunction with the accompanying drawings.

DESCRIPTION OF THE PREFERRED EMBODIMENT

Figure 1:
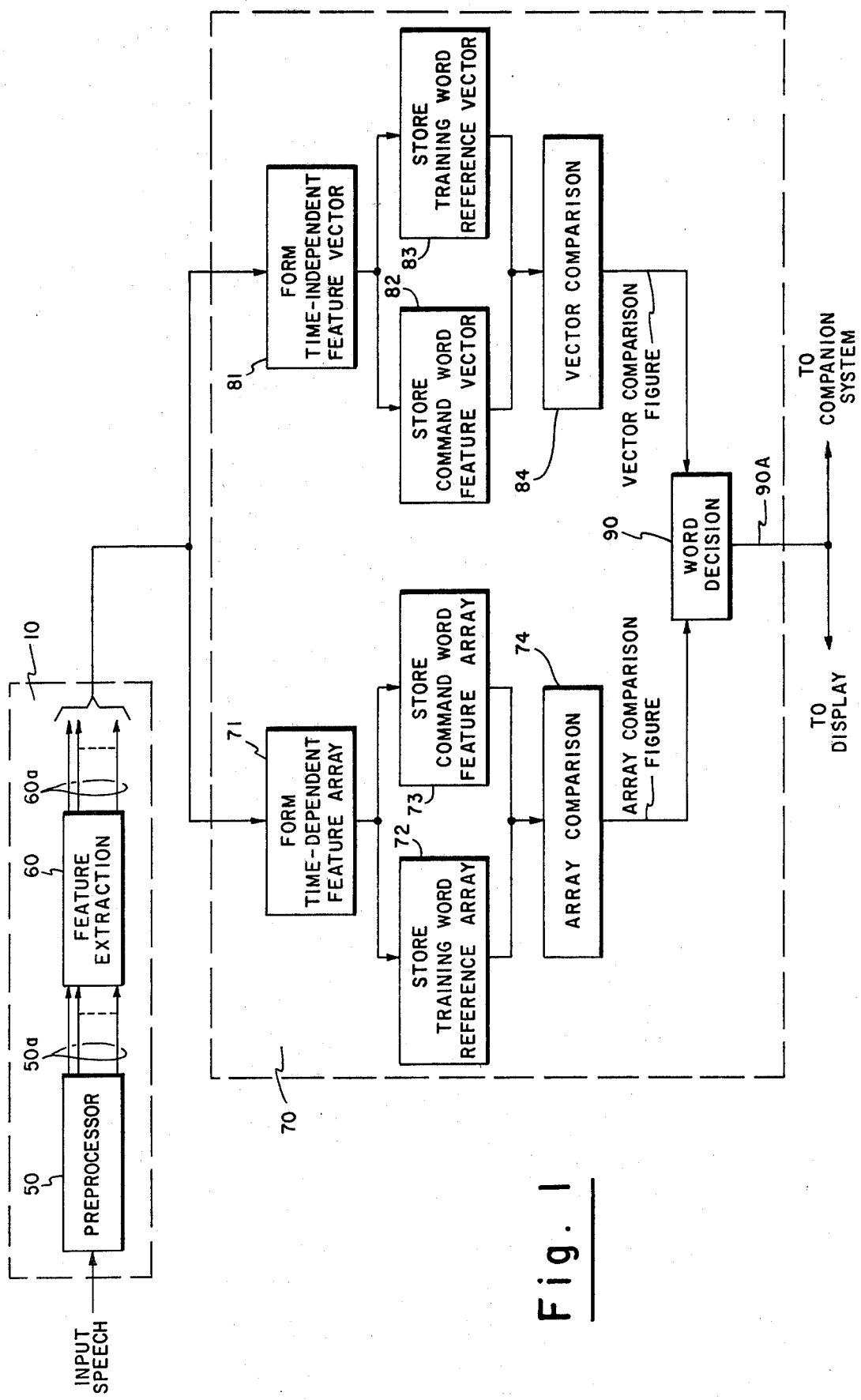
FIG. 1 is a simplified functional block diagram of an apparatus in accordance with an embodiment of the invention.

Referring to FIG. 1, there is shown a simplified functional block diagram of an apparatus in accordance with the invention. Input spoken words are received by a feature extraction means 10 which comprises preprocessor circuitry 50 and feature extraction circuitry 60. (As referred to herein, the terms "input spoken words", "spoken words", "speech", or the like are intended to generically include any acoustical or electrical representation of communicative sounds.) The preprocessor circuitry 50 utilizes a bank of bandpass filters to translate speech into a plurality of spectral component signals on lines 50a. The signals on lines 50a are received by the feature extraction circuitry 60 which generates feature output signals on particular ones of a number of feature output lines 60a, the particular ones depending on the features contained in the speech being received. Signals on the feature output lines may represent, for example, the presence of commonly used vowel or consonant sounds. As will be further described, the circuitry 50 and 60 may be a type that is known in the prior art.

The feature output lines 60a are coupled to processing circuitry, the functions of which are generally shown, for initial understanding of the invention, within the dashed enclosure 70. As will be described in detail hereinbelow, the processing circuitry is implemented in the present embodiment using a microprocessor, such as a model Z-80 manufactured by Zilog Corporation.

It will be understood, however, that the functions illustrated by these blocks can alternatively be implemented by other means, for example, using a suitable general or special purpose computer, or hard wired circuitry.

The block 71 represents the formation of a time-normalized array of features called a "feature array", which is representative of the features present during a spoken word. (See FIG. 5). During the so-called "training" mode of operation, the feature arrays formed during multiple utterances of a particular vocabulary word being "trained" (i.e., being entered into the system as a vocabulary word) are processed to form a "reference array" which is stored for the particular vocabulary word (again, see FIG. 5). This function is represented in FIG. 1 by the block 72. The reference arrays (one for each vocabulary word of the vocabulary for which the system is trained) are stored and used later, during the "command" mode of operation, as references against which the feature array of a received command word is compared. The storage of a command word feature array is represented by the block 73, and the array comparison is represented by the block 74.

As described so far in this paragraph, the present speech recognition system is similar to certain prior art speech recognition systems manufactured by applicant's assignee and disclosed, for example, in the above-referenced U.S. Pat. No. 4,069,393 and in copending U.S. Application Ser. Nos. 138,643 and 138,646. An important aspect of the present invention is that a non-time-dependent feature vector is also formed for the command word and for each training word (the vectors for the training words being called "reference vectors"). As will be described further hereinbelow, each non-time-dependent feature vector (or reference vector) in an n-dimensional vector that is indicative of the cumulative presence of each of n selected speech features, regardless of when the features occur during the word utterance. For example, if 31 features are used, the feature vector will be 31-dimensional; i.e., it will consist of 31 numbers, each number having a size which is indicative of the cumulative presence of one of the 31 features during the word utterance. A relatively low number would indicate that the feature was present during only a small portion (or not at all) of the word utterance, whereas a relatively high number would indicate that the feature was present during a relatively large portion of the word utterance. In FIG. 1, the block 81 represents the formation of a non-time-dependent (or time-independent) feature vector. During the "training" mode of operation, the feature vectors formed during multiple training utterances of a particular vocabulary word being "trained" are processed to form a "reference vector" which is stored for the particular vocabulary word. This function is represented in FIG. 1 by the block 82. As noted just above, the reference vectors (one for each vocabulary word of the vocabulary for which the system is trained) are stored for use later, during the "command" mode of operation, as references against which the feature vector of a received command word is compared. The storage of a command word feature vector is represented by the block 83, and the vector comparison is represented by the block 84.

In the present embodiment, the array comparison (block 74) results in an "array comparison figure" for each training word, and the vector comparison (block 84) results in a "vector comparison figure" for the training word. Both figures are utilized (as represented by block 90) in deciding which training word most closely matches the command word. In the present embodiment, the array comparison is given twice the weight of the vector comparison. The array comparison figure is added to the vector comparison figure in obtaining an overall comparison figure for each training word. However, it will be understood that alternative criteria which utilize both the array comparison and the vector comparison in other ways can also be employed to advantage. When the best match is selected, a determination is made as to whether or not it meets a predetermined correlation standard and, if so, the corresponding training (or vocabulary) word is deemed to be the command word. A signal on line 90A, digitally representative of the selected vocabulary word, is then typically coupled to a companion system (not shown) to control the companion system. Also, the selected vocabulary word can be coupled to a display (not shown) so that the operator can verify that his spoken words have been correctly recognized.

Figure 2:
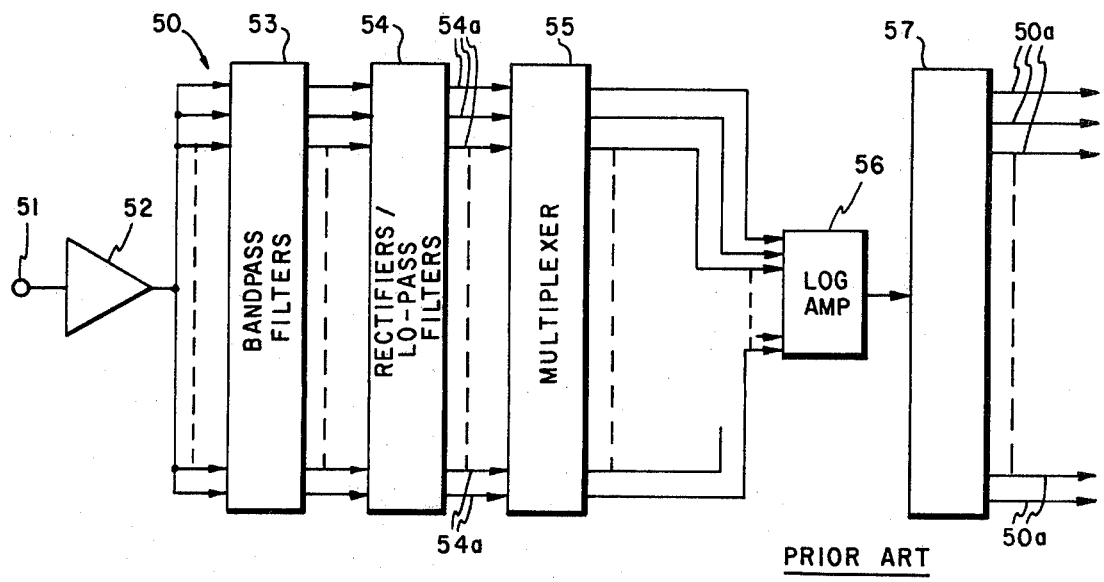
FIGS. 2 and 3 are block diagrams of prior art circuitry useful as the feature extraction portion of the invention.
Figure 3:
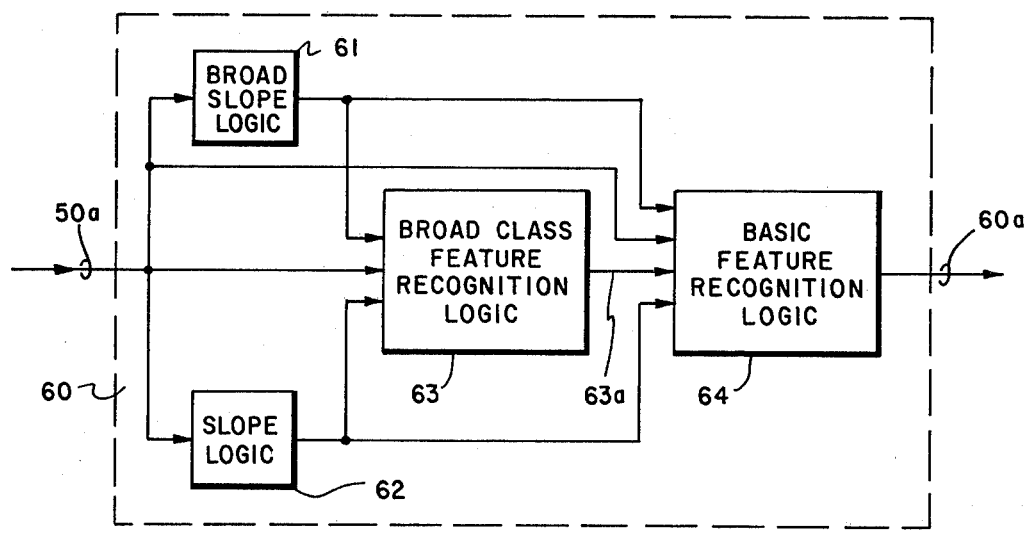

FIGS. 2 and 3 illustrate, in some further detail, prior art feature extraction means which is of a type that is suitable for use as the feature extraction means 10 of FIG. 1. A full description of both the proprocessor circuitry 50 and the feature extraction circuitry 60 can be found in a publication entitled "Acoustic Recognition of A Limited Vocabulary of Continuous Speech" by T. B. Martin and published by University Microfilms, Ann Arbor, Michigan. It should be emphasized, however, that the present invention deals largely with already-processed feature signals and any suitable means for obtaining the feature signals can be employed. Accordingly, the extent of detail set forth herein is limited to that needed to facilitate understanding of the portions of the apparatus thought inventive.

FIG. 2 is a block diagram of the preprocessor circuitry 50. A transducer 51, typically a gradient microphone, receives input spoken words and produces time-varying electrical signals that are representative of the received sounds. The output of transducer 51 is coupled, via preamplifier 52, to nineteen contiguous bandpass filters in a filter bank 53. Each filter in the bank produces an output signal related to that portion of the input signal which lies in the range of frequencies passed by the particular filter. Typically, the filter center frequencies range from about 250 to about 7500 Hz with the lowest filter bandwidth being about 150 Hz.

The output of each filter in the bank 53 is individually coupled to a full wave rectifier and lowpass filter combination located in a rectifier/lowpass filter bank 54. After rectification and filtering, the outputs of the bank 54 essentially represent the energy levels of the input signal at about the center frequencies of each of the bandpass filters in the bank 53. Viewed in another way, the signals on lines 54a collectively represent the envelope of the energy vs. frequency spectrum of the received input signal taken over the frequency range of interest.

The nineteen channels of information on lines 54a are logarithmically compressed to produce the spectral component outputs on lines 50a of the preprocessor. Logarithmic compression facilitates subsequent processing in two ways. First, it provides dynamic range compression that simplifies the engineering design requirements of feature extraction circuitry 60. Secondly, by virtue of using logarithms, comparative ratios of the spectral component signals can be readily computed by subtraction. Ratios are desirable processing vehicles in that they are independent of changes of overall signal amplitudes. This property is particularly advantageous in a system where input speech of varying loudness is to be recognized.

In the diagram of FIG. 2, a single log amplifier is time shard to avoid the necessity of using nineteen identical amplifiers to achieve compression. The outputs on 54a are effectively sampled by a multiplexer 55 and the sampled signals passed, one at a time, through the shared amplifier 56. A demultiplexer 57 then "reconstructs" compressed spectral component signals on lines 50a from the processed sampled signals. The sampling clock rate of the multiplexer and demultiplexer is above one KHz and is safely higher than is necessary to retain signal bandwidths. This technique is sharing a single logarithmic amplifier is known in the art and is disclosed, for example, in U.S. Pat. No. 3,588,363 of M. Herscher and T. Martin entitled "Word Recognition System for Voice Controller" as well as the above-referenced publication of T. Martin.

It will be recalled that the spectral component signals on lines 50a are entered into the feature extraction circuitry 60 (FIG. 1) which senses the presence of properties of the spectral component signals that correspond to preselected properties or "features" of input words. In the prior art feature extraction circuitry being described for illustration, this sensing of properties or "feature extraction" is achieved in part by deriving quantities known as "slope" and "broad slope" characteristics. These quantities give indication as to the polarity and magnitude of the slope of the input envelope when taken over specified segments of frequency spectrum. The manner in which these quantities are obtained is described in the above-referenced publication and patent.

FIG. 3 shows a block diagram of the prior art feature extraction circuitry 60 which receives the spectral component signals on the lines 50a. The circuitry 60, which is also described in the referenced publication and patent, includes logic blocks 61 and 62 which derive sets of slope and broad slope quantities that are received by a "broad class feature" recognition logic block 63. The block 63 utilizes groups of operational amplifiers and appropriate peripheral circuitry to generate broad class feature signals 63a that indicate the presence of certain broadly classified phonetic characteristics in the input words. Examples of the broad classification are "vowel/vowel like", "voicing only", "burst", "voiced noise-like consonant", etc. The signals 63a as well as the spectral component signals, slope, and broad slope signals are received by a "basic feature" recognition logic block 64. This block, which includes components that are similar in nature to the block 63, functions to generate the feature signals that indicate the presence of specific phonetic features (e.g. /I/, /s/, /θ/, /ʃ/) of the input spoken words. The block 64 will typically also include an intermediate block that derives "common group features" (e.g. "front vowel", "back vowel", "fricative", "stop consonant", etc.) and such common group features may sometimes be the most specific features derived for further processing by the system of FIG. 1. It should be emphasized, however, that the invention to be described is not limited to any particular form of feature signal generation.

Figure 4:
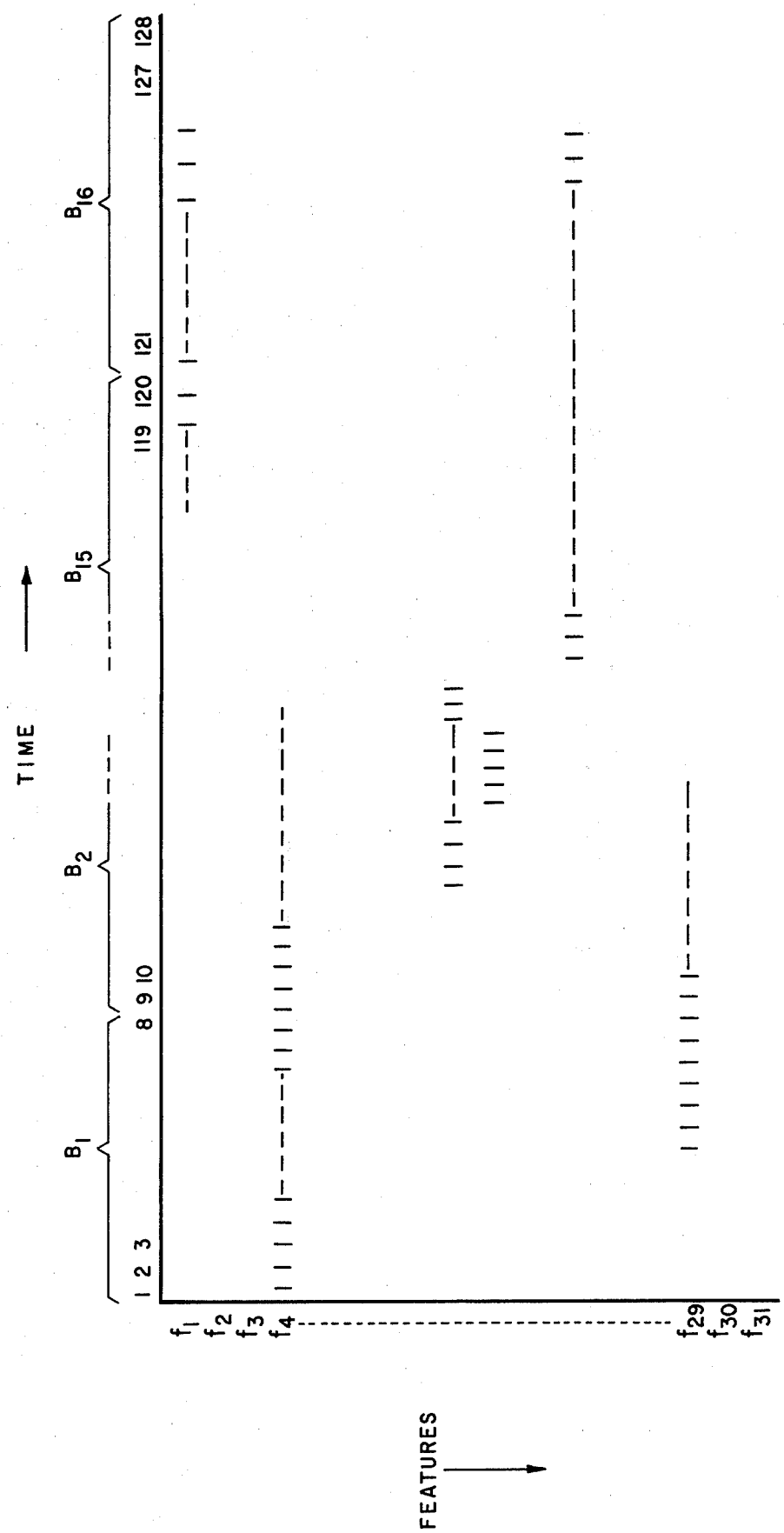
FIG. 4 illustrates the type of array that results from the storing of the status of binary features.
Figure 5:
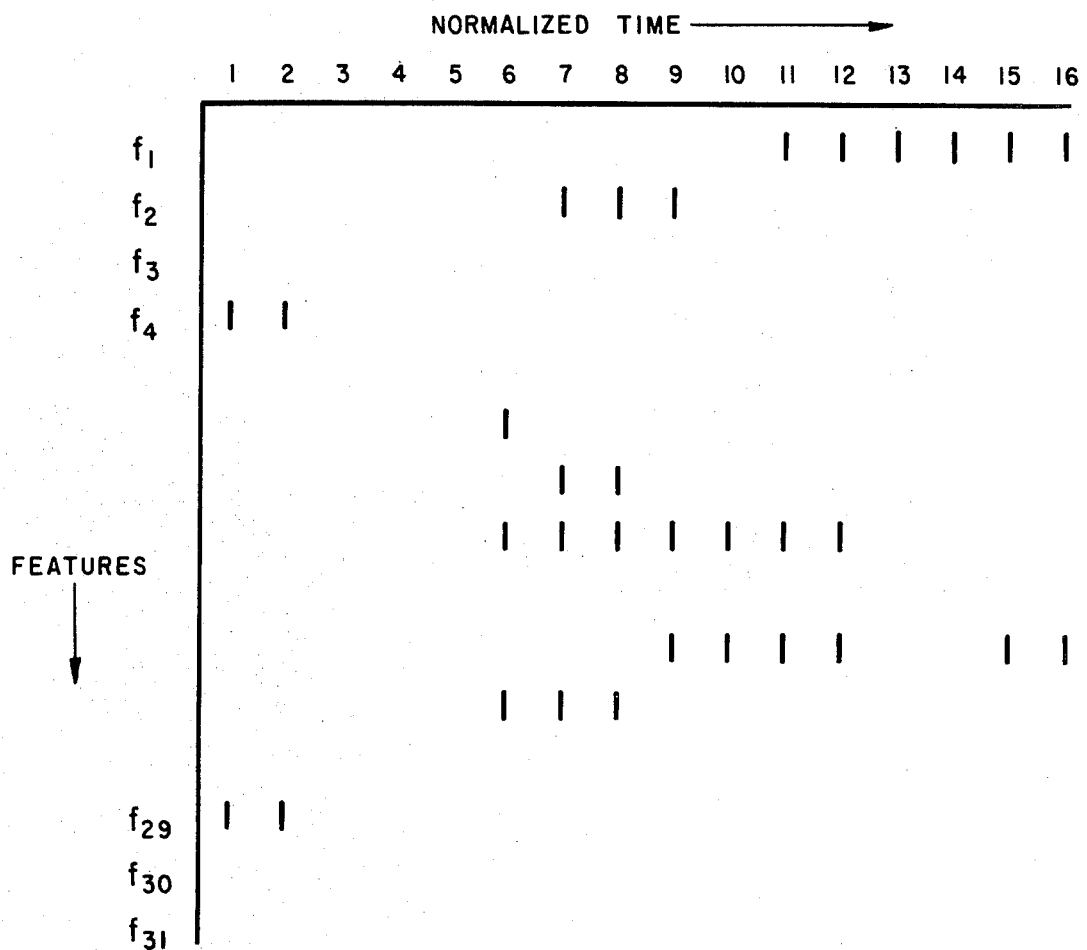
FIG. 5 illustrates the nature of a time-normalized feature array or reference array.

FIG. 4 is useful in understanding the operation of a portion of the processing circuitry 70 by showing the type of time-dependent array that results from storing the status of the binary features which occurred during a command or training word (e.g. blocks 71–73). In the present embodiment thirty-one binary feature signals, hereinafter sometimes designated $f_1$ through $f_{31}$, are derived on thirty-one feature output lines 60a and continuously indicate the presence or absence of specific features. The feature sample rate in the present embodiment is 10 milliseconds, so the statuses of the feature lines 60a are interrogated every 10 milliseconds. In the example of FIG. 4, it is assumed, for purposes of illustration, that the input word had a time duration of 1.28 seconds. This means that the resultant array has dimensions of $31 \times 128$. In other words, it records the presence or absence of each of 31 features over 128 sampled "time slots", each time slot being 10 milliseconds long. As is seen from the representative 1's of the FIGURE (inserted arbitrarily for illustration), different features occur for varying portions of the word duration with a particular feature usually being "on" continuously for a number of milliseconds. The absence of a "1" in an array position implies a 0; i.e., the absence of the feature. The time normalization function, performed by circuitry 70, reduces each input word array to a $31 \times 16$ array; the time axis being reduced down to 16 normalized time slots. The normalization can be performed in a number of ways, one technique involving the selection of the normalized time periods which include a majority of 1's. The arithmetic process for carrying out this technique is quite straightforward, basically involving simple division and counting. To illustrate, in the example of FIG. 4 the 128 time slots for each feature would be divided into groups of 8 as shown by the brackets labeled $B_1$ through $B_{16}$. Each bracket contains 8 time slots so, in this example, a particular normalized time slot for a feature will be assigned a 1 if the bracket contains at least 5 1's. In FIG. 4, the feature $f_1$ has a majority of 1's in the time included in bracket $B_{16}$. Therefore, the 16th and last normalized time slot for $f_1$ will contain a 1. An entire $31 \times 16$ normalized feature array is formed in this manner by examining the count of ones under each of 16 brackets for each of the 31 features. In the example given, the overall time is an exact multiple of 16, but if this is not the case, any remainder is distributed among the brackets in a specified manner. For example, if there had been originally 115 time slots (1230 milliseconds), then each of the first three brackets would have included 8 time slots, with the remainder of the brackets including 7 time slots. FIG. 5 illustrates a typical normalized feature array for a command word with the 1's again being shown and 0's being implied by the absence of a 1 at the array position.

In the present embodiment, the thirty-one feature lines (60a-FIG. 1) are sampled every 10 milliseconds, and the sampled feature signals are stored in an input buffer (not shown-part of block 71 in FIG. 1). The input buffer is operated in a "recirculating" fashion in that the samples loaded therein are dumped into successive addresses thereof until the highest address is reached, whereupon the next sample is loaded into the lowest address. The results in the buffer always holding the latest succession of thirty-one bit feature samples, the number of samples depending on the size of the buffer used. A detailed description of an input buffer of this type is set forth, for example, in the above-referenced copending U.S. Application Ser. No. 138,643. Again, it is noted that the particular manner in which the feature arrays are formed is not an inventive aspect of the present invention, and the level of description thereof in the present application is intended to facilitate understanding of the inventive portions hereof. A further prior art technique that is used in the present invention is the generation of a so-called "pause" feature, $f_o$, which indicates the presence (or absence) of speech-like sounds, and which is used in the present embodiment to determine the boundaries of individual words spoken in isolation. A simple pause feature may be generated by "OR"ing the 31 features $f_1$ through $f_{31}$ in conjunction with an energy threshold requirement, and providing sufficient hysteresis to make the pause feature responsive to the absence of energy for greater than a prescribed minimum time. If further description of pause feature or word boundary considerations is desired, reference can be made to the above-referenced patent and applications, as well as to U.S. Pat. No. 4,032,710 entitled "Word Boundary Detector For Speech Recognition Equipment".

Figure 6A:
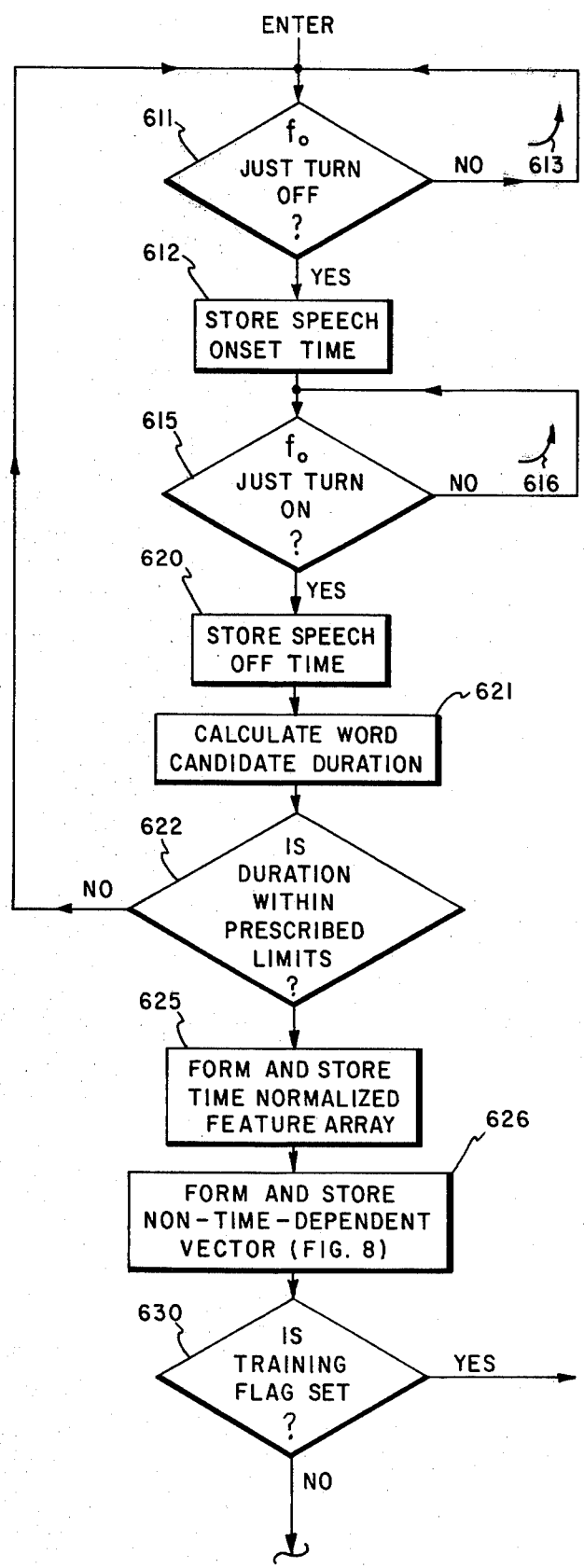
FIGS. 6 (consisting of 6A and 6B), 7 and 8 are flow diagrams suitable for implementing a general purpose computer or processor to perform the functions represented by the processing circuitry of FIG. 1.
Figure 6B:
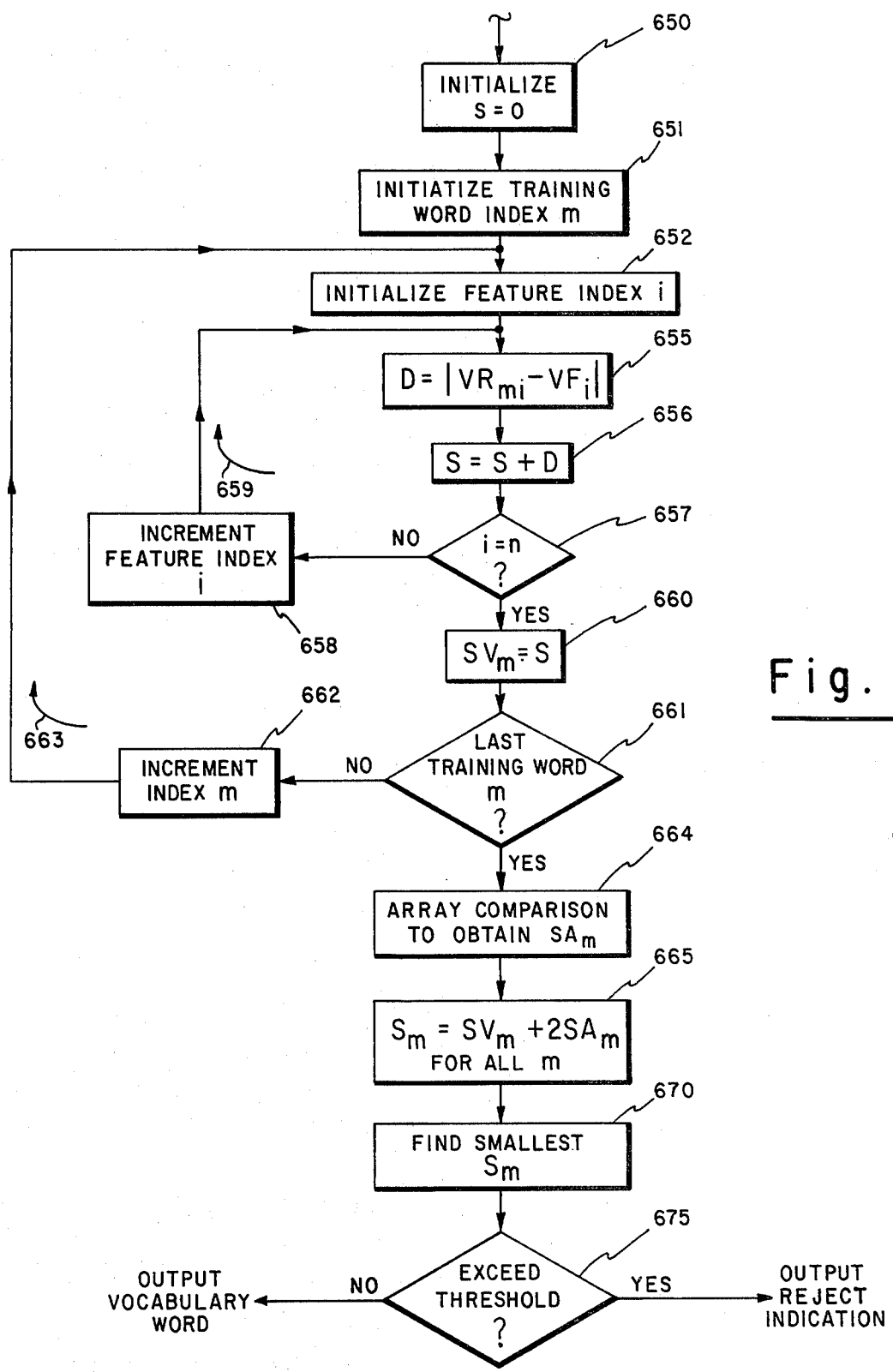
Figure 7:
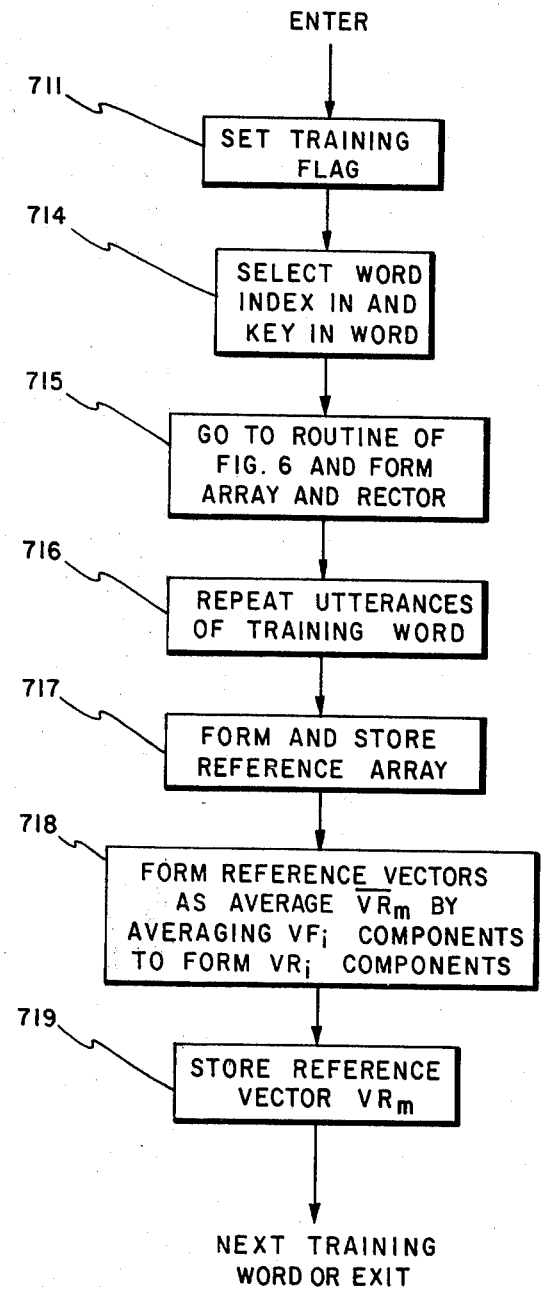
Figure 8:
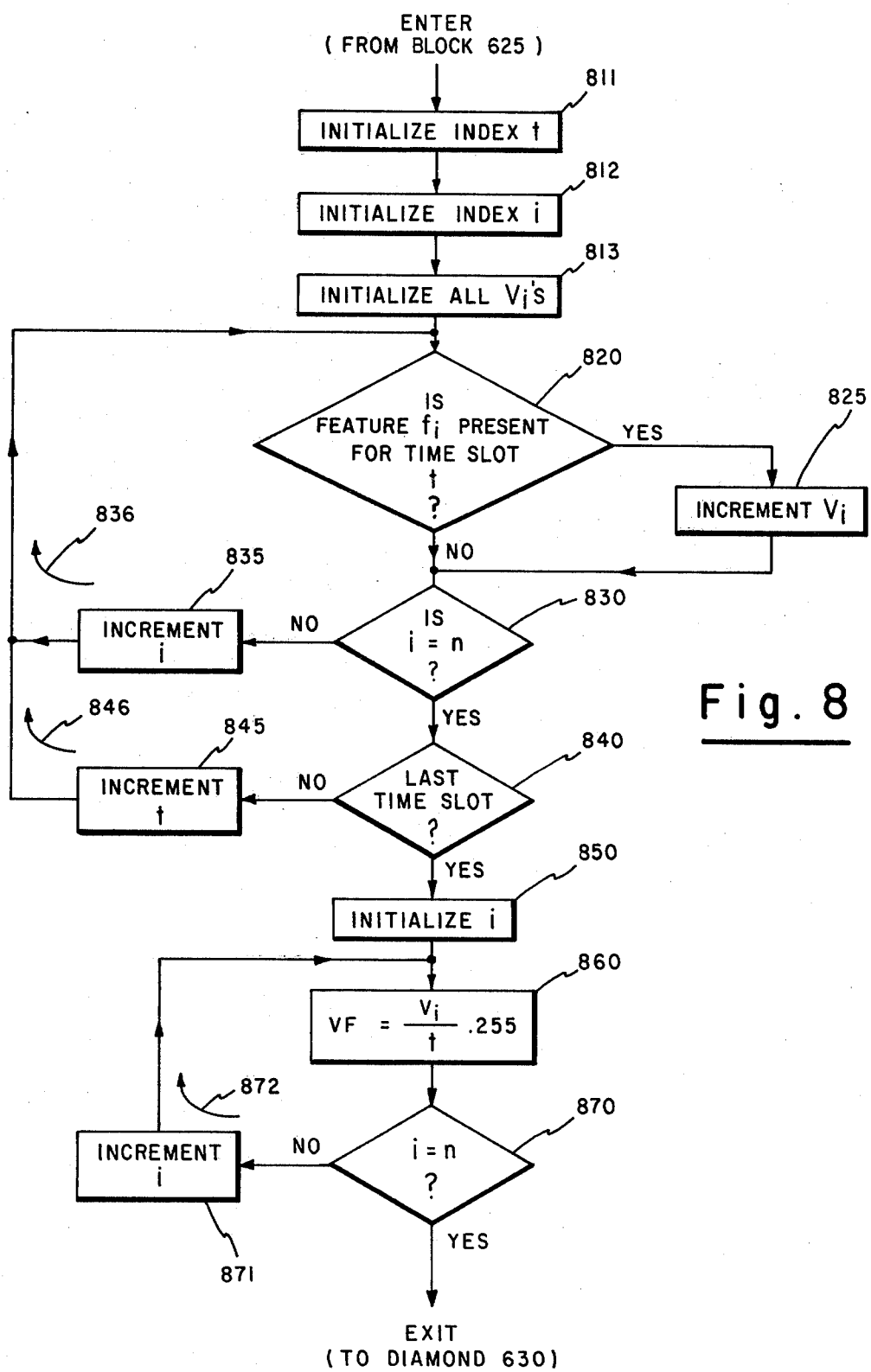

Having briefly described the manner in which incoming feature samples are handled during array formation and in which a "pause" feature is generated (both of these being consistent with prior art speech recognition equipments), the description of the flow diagram of FIGS. 6–8 will be facilitated. Also, a further understanding of the formation of the non-time-dependent feature vectors will be gained.

Referring to FIGS. 6–8, there is shown a flow diagram suitable for implementing a general purpose microprocessor or other processor to perform the functions represented by the processing circuitry 70. In FIG. 6A, the diamond 611 represents inquiry as to whether or not the "pause" feature $f_o$ has just turned off; i.e., a determination of whether or not the onset of speech has just occurred. If so, the time of the onset of speech is stored (as represented by block 612), and, if not, the "wait" loop 613 is entered or continued. Typically, the time of onset of speech can be stored by noting the address of the particular thirty-one bit feature sample that is stored when the pause feature $f_o$ goes off. The diamond 615 is next entered and represents the determination of whether or not the pause feature $f_o$ has just turned on; i.e., whether or not a potential spoken word has just ended. If not, the wait loop 616 continues until the end of the spoken word, whereupon block 620 is entered and the time at which speech ended is stored. Next, the block 621 represents determination of the duration of the spoken word candidate which has just occurred, this being done by subtracting the times determined via blocks 612 and 620. A determination is then made (diamond 622) as to whether or not the duration of the word candidate is within prescribed duration limits. In the present isolated speech embodiment, the shortest acceptable word has a duration of 180 milliseconds (18 10 millisecond samples), and the longest acceptable word has a duration of 1.28 seconds (128 10 millisecond samples). It will be understood, however, that any suitable limits can be prescribed. If the word candidate duration is within the prescribed limits, a time normalized feature array (of the type illustrated in FIG. 5) is formed for the features of the spoken command word. This function is represented by the block 625. It will be understood that the present invention does not depend on a particular format of feature array or reference array to be used. Accordingly, the extent of detail of array formation set forth herein is limited to that needed to facilitate understanding of the portions of the apparatus thought inventive. For further description, reference can be made to the above-referenced U.S. Patent and application. The block 626 is next entered, this block representing the formation of a non-time-dependent vector for the spoken word. The routine represented by the block 626 is set forth in FIG. 8. After formation of the time-normalized feature array and non-time-dependent vector, determination is made as to whether or not the training flag is set (diamond 630), the training flag indicating that the training mode is active. If so, return is made to the training routine (FIG. 7-to be described). If not, the command mode of operation is active, and recognition of the spoken command word (for which a feature array and a feature vector were just formed and stored) is implemented in accordance with the remainder of the routine of FIG. 6. In other words, the remainder of the routine of FIG. 6 implements the functions indicated generally by the blocks 74,84, and 90 of FIG. 1. However, before proceeding with description of the remainder of the routine of FIG. 6, reference will be made to FIG. 8 and FIG. 7 for a further understanding of the manner in which the command word feature vector and the training word reference vectors are formed and stored.

FIG. 8 illustrates the flow diagram for the routine represented by block 626 of FIG. 6; i.e., the routine for forming and storing the non-time-dependent vector for a spoken word (either training or command). A time slot index t is initialized at 1 (to start with the first time slot of the word being processed) and a feature index i is also initialized at 1 (blocks 811 and 812). In the present embodiment 31 different features are utilized, and each vector to be formed is thirty-one dimensional; i.e., it has 31 numerical components that are respectively representative of the cumulative occurrence of the 31 features during the spoken word being processed. A set of variables $V_i$, which are used to keep track of the cumulative occurrence of each feature $f_i$ during the word, are initialized at zero (block 813). Determination is then made (diamond 820) as to whether or not the feature i is present during the particular time slot being processed. If so, $V_i$ is incremented by 1, as represented by the block 825. Decision diamond 830 is next entered (and is also directly entered from the "no" output branch of diamond 820), and determination is made as to whether or not i equals n; that is, whether or not the last feature has been processed for this time slot. If not, the feature index i is incremented (block 835) and diamond 820 is reeneetered. The loop 836 will then continue until the running sums $V_i$ for all features have either been incremented or not incremented, depending upon whether or not each feature $f_i$ is present when interrogated during the particular time slot in question. When the loop 836 is complete, determination is made (diamond 84) as to whether the last time slot of the word being processed has been reached. If not, the time slot index t is incremented (block 845) and the loop 846 then continues until all time slots have been considered. Accordingly, when the loop 846 is complete (i.e., the answer to the inquiry of diamond 840 is "yes"), each of the running sums $V_i$ will be a number that is equal to the number of time slots during which the feature $f_i$ was present in the spoken word being processed. The block 850 is then entered and the feature index i is again initialized at unity. Each feature vector component $VF_i$ is then computed in accordance with $$VF_i = (V_i/t \cdot 255$$

where t is the time slot index and is now equal to the total number of time slots in the spoken word being processed (having been suitably incremented above—block 845). Thus, it is seen that the feature vector component $VF_i$ will be a number between 0 and 255 whose magnitude depends upon the cumulative percentage of time that the feature $f_i$ was present in the spoken word being processed. For example, if the feature $f_i$ was not present at all during the spoken word, the final $V_i$ would be 0, so $VF_i$ would also be 0. On the other hand, if the feature was found to be present during every time slot, then the final $V_i$ would equal t, so $VF_i$ would equal 255. It will be understood that the vector component $VF_i$, while depending upon the fraction of the spoken word during which the particular feature was present, is in no way dependent upon when during the word such feature was present, and is accordingly designated as a non-time-dependent feature vector component. The loop 872, including diamond 870 and block 871, is used to iterate through all features to obtain feature vector components $VF_i$ for each feature $f_i$, these vector components together comprising the feature vector VF. At this point, the routine of FIG. 8 (block 626 of FIG. 6) is completed, and return is made to diamond 630 of FIG. 6.

FIG. 7 is a flow diagram of the routine for implementing the training mode. When the training mode is activated (typically, by an operator via a keyboard command), the routine is entered and the training flag is set (block 711). An index number m is then assigned to the vocabulary word to be trained (block 714), and the word is typically keyed in and displayed to the operator for verification. This can be used as a cue for the operator to speak the word to be trained. The block 715 is next entered, this block representing the formation of the time-normalized feature array and the non-time-dependent vector for the next spoken word; i.e., the particular vocabulary word being trained. In particular, the routine of FIG. 6 is temporarily entered (diamond 611) and is used to form the feature array and feature vector for the operator's utterance of the particular vocabulary word being trained. The blocks 716-718 are next entered, these blocks representing the formation of the training word's reference array and reference vector from a sequence of successive utterances of the training word. The reference array is formed by detecting the number of times each feature is found to occur at each time slot during successive utterances (e.g. five utterances) of the training word. If the feature is found to be present more than a specified number of times, the feature is considered as being present at the particular time slot for purposes of the reference array, and a "1" is placed at the particular position of the reference array. If not, the feature is considered to be absent at the particular time slot, and a "0" is placed at the array location. It will be understood that there are a number of techniques known in the art for forming reference arrays, and the particular technique used is not an aspect of the present invention. Accordingly, the limited description herein of formation and use of the reference arrays is for the purpose of facilitating understanding of the present invention, and reference can be made to U.S. Application Ser. Nos. 138,643 and 138,646 for further disclosure of reference array formation. Regarding reference vector formation, the reference vector $VR_m$ for vocabulary word m is obtained by averaging the components $VF_i$ for the repeated utterances of the training word to form reference vector components designated $VR_{mi}$. Thus, each reference vector component $VR_{mi}$ of reference vector $V_m$ is a number between 0 and 255 which represents the average expected cumulative occurrence of the feature $f_i$ during the vocabulary word in that was just trained. After formation of the reference vector, it is stored, in conjunction with its index number m, as was the reference array for word m. Subsequent vocabulary words can then be "trained" in the same manner.

Reference can now again be made to FIG. 6 for a description of the manner in which the array comparisons, vector comparisons, and word decision functions (blocks 74, 84 and 90 of FIG. 1) can be implemented. Regarding vector comparison, the feature vector for the command word, VF, is compared against the reference vector for each vocabulary word m, $VR_m$, to obtain a vector comparison figure, $SV_m$, for the particular training or vocabulary word m. This is done by determining the absolute value of the difference of each reference vector component $VR_{mi}$ and each feature vector component $VF_i$ and then obtaining the sum of said differences in accordance with:

$$SV_m = \sum_{i=1}^{n} |VR_{mi} - VF_i|$$

where n is the number of features being used in the vector (31 in the present embodiment). In this manner, the vector difference sum $SV_m$ for each vocabulary word m will be reflective of the difference between the feature vector of the command word and the reference vector of the training word m.

In accordance with the routine of FIG. 6, the sum $SV_m$ is obtained as follows: A variable S, which is used to accumulate a running sum of differences, is initialized at zero (block 650), and the training word index m is initialized at one (block 651). The feature index i is also initialized at one (block 652). A difference variable, designated D, is then computed as the absolute value of the difference between $VR_{mi}$ and $VF_i$, this function being represented by the block 655. D is then added to S, as represented by the block 656. Inquiry is then made as to whether or not the feature index has reached the last feature, n (diamond 657). If not, the feature index i is incremented (block 658) and the block 655 is reentered for a continuation of the loop 659 through all features. When the loop 659 is complete, S will equal the desired sum $SV_m$, so $SV_m$ is set equal to S, as indicated by the block 660. The loop 663 is then utilized to obtain the sum $SV_m$ for each training word m. This is done by testing the training word index (diamond 661), and appropriately incrementing this index (block 662) until all training words have been treated.

The block 664 is next entered, this block representing the comparison of the feature array for the command word with each training word reference array to obtain an array comparison figure designated $SA_m$ for each training word. The particular technique of array comparison that is used is not an aspect of the present invention and is, of itself, known in the art. Reference can be made, however, to the above-referenced U.S. Pat. No. 4,069,393 and to U.S. Application Ser. Nos. 138,643 and 138,646 for disclosure of appropriate means for implementing the array comparisons. It will be understood that in accordance with the above expression for $SV_m$, the closest match will yield the lowest sum $SV_m$. After using an array matching technique (block 664) to obtain an array comparison figure, $SA_m$, that also yields lowest scores for the best matches, a weighted sum $s_m$, for each training word m, is obtained (block 665). In the present embodiment a weighting of $SV_m$ and $25 A_m$ is set forth, but it will be understood that other weightings can be employed, the important aspect being that both time-dependent and non-time-dependent feature occurrences are taken into account in the matching procedure. In the present embodiment the smallest $S_m$ is obtained (block 670). A determination is then made, as represented by decision diamond 675, as to whether or not said smallest sum exceeds a predetermined threshold that is used to insure that the best match is sufficiently correlated to indicate with confidence that one of the training words in the vocabulary had indeed been spoken. If the threshold is exceeded, a "reject" signal is output of line 90A (typically to a display—not shown) to indicate to the operator that the spoken command word was not recognized. If the threshold is not exceeded, however, a signal on line 90A (FIG. 1), digitally representative of the selected vocabulary word, is coupled to the companion system (not shown) being controlled, and also to the display, which provides feedback to the operator that the spoken command word was properly recognized.

The invention has been described with reference to a particular embodiment, but variations within the spirit and scope of the invention will occur to those skilled in the art. For example, in the present embodiment the non-time-dependent feature vectors are illustrated as being obtained from the same feature signals used to develop the time-dependent feature arrays, but it will be understood that other groups of features can be utilized. Also, while a particular technique is set forth for generating the non-time-dependent feature vectors, it will be understood that various alternatives are possible for both the manner of developing the feature vectors (which may depend upon the types of features available and the way in which they are represented) and the manner of comparison of the vectors. Finally, it can be noted that the time-dependent feature arrays can utilize multiple bits at array positions, as described in the above-referenced U.S. Application Ser. Nos. 138,643 and 138,646. In this same context the features used in forming the feature vectors could reflect the relative strength with which a feature is present.

We claim:

1. Apparatus for receiving spoken input training words and for subsequently recognizing a spoken input command word, comprising:

feature extraction means for generating feature signals indicative of the presence or absence of features in a spoken input word;

means for storing, as a time-dependent reference array, the presence or absence status of feature signals during each training word;

means for storing, as a non-time-dependent reference vector, an indication of the cumulative presence of feature signals during each training word;

means for storing, as a time-dependent feature array, the status of feature signals during the command word;

means for storing, as a non-time-dependent feature vector, an indication of the cumulative presence of feature signals during the command word;

means for comparing member-by-member, the command word feature array with each training word reference array to obtain an array comparison figure for each training word;

means for comparing, feature-by-feature, the command word feature vector with each training word reference vector to obtain a vector comparison figure for each training word; and means responsive to both the array comparison figure and the vector comparison figure for each training word for selecting the training word which most closely matches the command word.

2. Apparatus as defined by claim 1 wherein said means for selecting said training word is responsive to a weighted sum of said array comparison figure and said vector comparison figure.

3. Apparatus as defined by claim 1 wherein said non-time-dependent reference vectors and feature vectors are representative of the normalized cumulative fractions of the spoken word duration during which individual feature components are present.

4. Apparatus as defined by claim 2 wherein said non-time-dependent reference vectors and feature vectors are representative of the normalized cumulative fractions of the spoken word duration during which individual feature components are present.

5. Apparatus as defined by claim 1 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

6. Apparatus as defined by claim 2 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

7. Apparatus as defined by claim 4 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

8. Apparatus for receiving spoken input training words and for subsequently recognizing a spoken input command word and generating an occurrence indication indicative of said command word, said occurrence indication being suitable for control of a companion system, comprising:

feature extraction means for generating feature signals indicative of the presence or absence of features in a spoken input word;

means for storing, as a time-dependent reference array, the presence or absence status of feature signals during each training word;

means for storing, as a non-time-dependent reference vector, an indication of the cumulative presence of feature signals during each training word;

means for storing, as a time-dependent feature array, the status of feature signals during the command word;

means for storing, as a non-time-dependent feature vector, an indication of the cumulative presence of feature signals during the command word;

means for comparing member-by-member, the command word feature array with each training word reference array to obtain an array comparison figure for each training word;

means for comparing, feature-by-feature, the command word feature vector with each training word reference vector to obtain a vector comparison figure for each training word; and means responsive to both the array comparison figure and the vector comparison figure for each training word for selecting the training word which most closely matches the command word and for generating an occurrence indication that represents the selected training word.

9. Apparatus as defined by claim 8 wherein said means for selecting said training word is responsive to a weighted sum of said array comparison figure and said vector comparison figure.

10. Apparatus as defined by claim 8 wherein said non-time-dependent reference vectors and feature vectors are representative of the normalized cumulative fractions of the spoken word duration during which individual feature components are present.

11. Apparatus as defined by claim 9 wherein said non-time-dependent reference vectors and feature vectors are representative of the normalized cumulative fractions of the spoken word duration during which individual feature components are present.

12. Apparatus as defined by claim 8 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

13. Apparatus as defined by claim 9 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

14. Apparatus as defined by claim 11 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

15. Apparatus as defined by claim 9 wherein said occurrence indication is generated only when the combination of said array comparison figure and said vector comparison figure meets a predetermined standard.

16. Apparatus as defined by claim 10 wherein said occurrence indication is generated only when the combination of said array comparison figure and said vector comparison figure meets a predetermined standard.

17. Apparatus as defined by claim 11 wherein said occurrence indication is generated only when the combination of said array comparison figure and said vector comparison figure meets a predetermined standard.

18. A method for receiving spoken input training words and for subsequently recognizng a spoken input command word, comprising the steps of:
   generating feature signals indicative of the presence or absence of features in a spoken input word;
   storing, as a time-dependent reference array, the presence or absence status of feature signals during each training word;
   storing, as a non-time-dependent reference vector, an indication of the cumulative presence of feature signals during each training word;
   storing, as a time-dependent feature array, the status of feature signals during the command word;
   storing, as a non-time-dependent feature vector, an indication of the cumulative presence of feature signals during the command word;
   comparing member-by-member, the command word feature array with each training word reference array to obtain an array comparison figure for each training word;
   comparing, feature-by-feature, the command word feature vector with each training word reference vector to obtain a vector comparison figure for each training word; and
   selecting, as a function of both the array comparison figure and the vector comparison figure, the training word which most closely matches the command word.

19. The method as defined by claim 18 wherein said training word is selected as a function of a weighted sum of said array comparison figure and said vector comparison figure.

20. The method as defined by claim 18 wherein said non-time-dependent reference vectors and feature vectors are representative of the normalized cumulative fractions of the spoken word duration during which individual feature components are present.

21. The method as defined by claim 19 wherein said non-time-dependent reference vectors and feature vectors are representative of the normalized cumulative fractions of the spoken word duration during which individual feature components are present.

22. The method as defined by claim 18 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

23. The method as defined by claim 19 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ are the individual vector components for the command word.

24. The method as defined by claim 21 wherein said vector comparison figure $SV_m$ for each training word m is determined as being $$SV_m = \sum_{i=1}^{n} |VR_{mi} - VF_i|$$

where n is the number of features in the vector, $VR_{mi}$ are the individual vector components for the training word m, and $VF_i$ re the individual vector components for the command word.

* * * * *